United States Patent
Ogawa (10) Patent No.: US 10,477,055 B2
(45) Date of Patent: Nov. 12, 2019

(54) IMAGE FORMING APPARATUS

(71) Applicant: KYOCERA Document Solutions Inc., Osaka (JP)

(72) Inventor: Shinya Ogawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/196,665

(22) Filed: Nov. 20, 2018

(65) Prior Publication Data

US 2019/0182397 A1 Jun. 13, 2019

(30) Foreign Application Priority Data

Dec. 8, 2017 (JP) ................. 2017-236248

(51) Int. Cl.
*H04N 1/00* (2006.01)
*H04N 1/393* (2006.01)
*G06K 9/34* (2006.01)

(52) U.S. Cl.
CPC ......... *H04N 1/00822* (2013.01); *G06K 9/344* (2013.01); *H04N 1/0044* (2013.01);
(Continued)

(58) Field of Classification Search
CPC ....... G06K 2009/2045; G06K 9/00234; G06K 9/00711; G06K 9/2027; G06K 9/209; G06K 9/342; G06K 9/46; G06K 9/4652; G06K 9/66; G06K 2209/15; G06K 9/00449; G06K 9/00791; G06K 9/325; G06K 9/42; G06K 9/6255; G06K 9/00463; G06K 9/00469; G06K 9/00483; G06K 9/00671; G06K 9/3275; G06K 9/4633; G06K 9/62; G06K 9/6201; G06K 2209/01; H04N 5/23238; H04N 5/247; H04N 5/33; H04N 7/181; H04N 5/23232; H04N 5/23296; H04N 5/3415; H04N 1/00; H04N 5/2251; H04N 5/232; H04N 5/23299; H04N 1/00416; H04N 1/12; H04N 1/3878; H04N 1/40062;
(Continued)

(56) References Cited

U.S. PATENT DOCUMENTS

| 6,232,955 B1 * | 5/2001 | Guttag | G09G 5/06 345/601 |
| 2005/0057209 A1 * | 3/2005 | Andoh | H02P 8/32 318/696 |

(Continued)

FOREIGN PATENT DOCUMENTS

JP 2006-166329 A 6/2006

*Primary Examiner* — Negussie Worku
(74) *Attorney, Agent, or Firm* — Stein IP, LLC (57) ABSTRACT

An image forming apparatus includes an image reader, a controller, and an output section. The image reader reads a document at a highest resolution. The controller generates, from first image data obtained by reading of the document performed at the highest resolution, second image data having a resolution that is lower than the highest resolution, and sets a resolution of output image data based on a result of comparison between a first recognition result, which is a recognition result of character recognition processing performed on the first image data, and a second recognition result, which is a recognition result of character recognition processing performed on the second image data.

7 Claims, 6 Drawing Sheets

(52) U.S. Cl.
CPC ....... *H04N 1/3935* (2013.01); *G06K 2209/01* (2013.01); *H04N 2201/0094* (2013.01)

(58) Field of Classification Search
CPC ...... B41J 29/393; G06F 16/00; G06F 16/538; G06F 16/951; G06F 17/2765; G09G 2370/027; H04L 12/16; H04L 51/32
USPC .................................... 358/474, 475, 509
See application file for complete search history.

(56) References Cited

U.S. PATENT DOCUMENTS

| | | | |
|---|---|---|---|
| 2006/0001690 A1* | 1/2006 | Martinez | B41J 29/393 347/19 |
| 2006/0045357 A1* | 3/2006 | Schwartz | H04N 19/503 382/232 |
| 2008/0170137 A1* | 7/2008 | Matsumoto | H04N 5/347 348/241 |
| 2011/0285874 A1* | 11/2011 | Showering | G06K 9/033 348/231.99 |
| 2012/0120444 A1* | 5/2012 | Hirohata | G06K 9/00449 358/1.15 |
| 2015/0124296 A1* | 5/2015 | Ogawa | H04N 1/32614 358/402 |
| 2015/0281472 A1* | 10/2015 | Ogawa | H04N 1/00095 358/406 |
| 2017/0094106 A1* | 3/2017 | Ogawa | H04N 1/32708 |
| 2017/0176594 A1* | 6/2017 | Ichikawa | G01S 7/524 |
| 2018/0129155 A1* | 5/2018 | Ogawa | G03G 15/5087 |
| 2019/0049934 A1* | 2/2019 | Ogawa | G05B 19/41815 |
| 2019/0182397 A1* | 6/2019 | Ogawa | H04N 1/0044 |
| 2019/0212444 A1* | 7/2019 | Ogawa | B60R 21/00 |

* cited by examiner

IMAGE FORMING APPARATUS

INCORPORATION BY REFERENCE

This application is based upon and claims the benefit of priority from the corresponding Japanese Patent Application No. 2017-236248 filed on Dec. 8, 2017, the entire contents of which are incorporated herein by reference.

BACKGROUND

The present disclosure relates to an image forming apparatus that reads a document and generates image data of the document.

Conventionally, there have been known image forming apparatuses that are capable of performing character recognition processing. Such conventional image forming apparatuses perform the character recognition processing on the image data of a document obtained by reading of the document. The conventional image forming apparatuses then check, based on the result of the character recognition processing, whether this read document is the same document that they have printed on a sheet before.

SUMMARY

According to an aspect of the present disclosure, an image forming apparatus includes an image reader, a controller, and an output section. The image reader reads a document and generates image data of the document. The controller generates output image data from the image data of the document. The output section externally outputs the output image data. Here, the image reader reads the document at a highest resolution of a predetermined plurality of levels of resolutions. The controller generates second image data having a resolution lower than the highest resolution from first image data, which is image data of the document obtained by reading of the document performed at the highest resolution, performs character recognition processing on both the first image data and the second image data, and sets a resolution of the output image data based on a result of comparison between a first recognition result, which is a recognition result of the character recognition processing performed on the first image data, and a second recognition result, which is a recognition result of the character recognition processing performed on the second image data.

DETAILED DESCRIPTION

Hereinafter, an image forming apparatus according to an embodiment of the present disclosure will be described by taking a multifunction peripheral as an example of the image forming apparatus. Multifunction peripherals incorporate a plurality of functions including scanning, printing, and transmitting (facsimile) functions. That is, multifunction peripherals are capable of executing, for example, a copy job in which an image is printed on a sheet based on the image data of a document by using the scanning function and the printing function, and a transmission job in which the image data of the document is transmitted to an external device by using the scanning function and the transmitting function.

Figure 1:
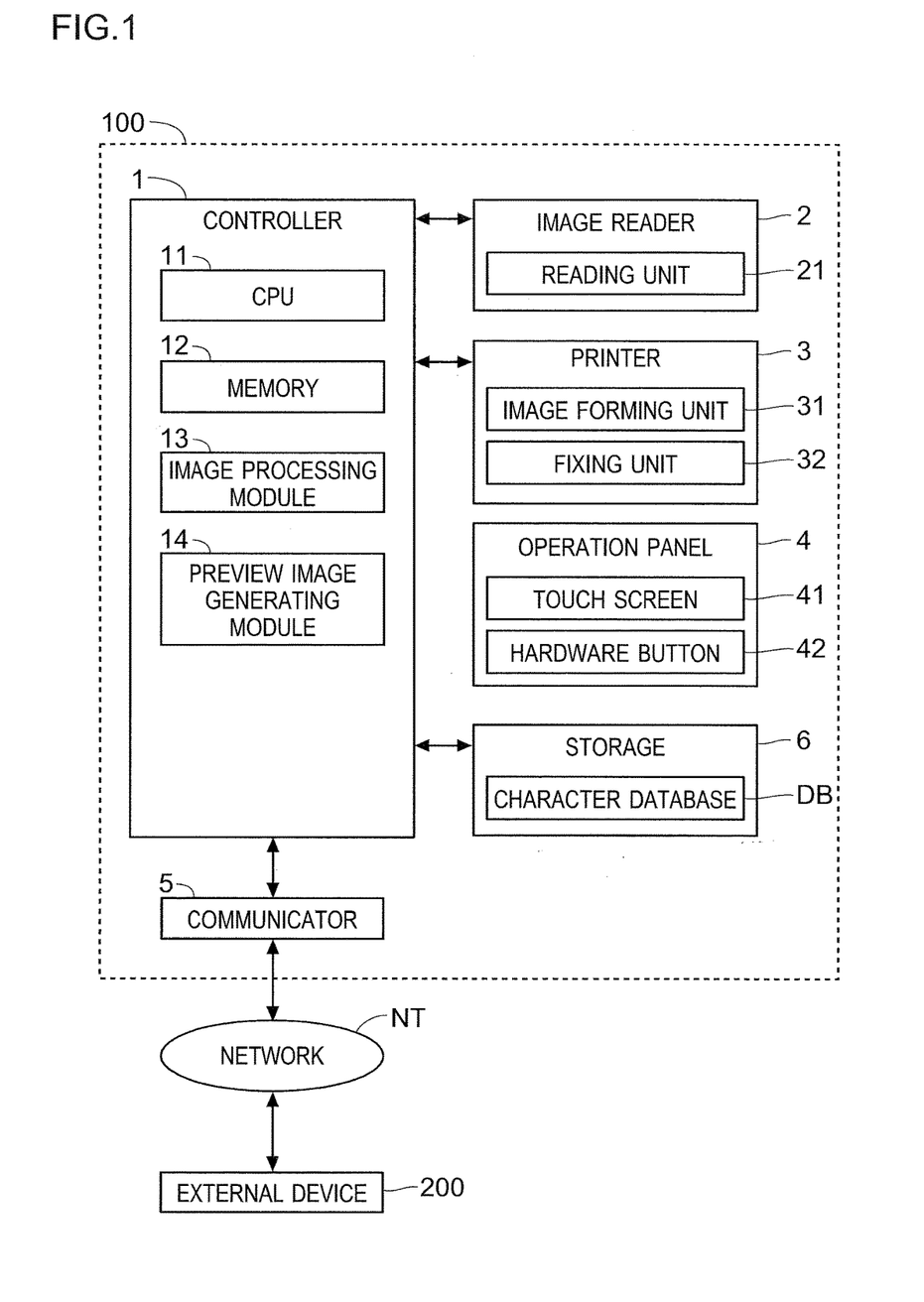
FIG. 1 is a block diagram illustrating a configuration of a multifunction peripheral according to an embodiment of the present disclosure.

Configuration of Multifunction Peripheral:

As illustrated in FIG. 1, a multifunction peripheral 100 of the present embodiment includes a controller 1. The controller 1 includes a CPU 11, a memory 12, an image processing module 13, and a preview-image generating module 14. The CPU 11 operates based on a control program and control data, and performs processing for controlling various sections of the multifunction peripheral 100. The memory 12 has stored therein the control program and the control data for making the CPU 11 operate.

The image processing module 13 includes, for example, a dedicated circuit and a dedicated memory that are used exclusively for image processing of various kinds performed on the image data. The controller 1 uses the image processing module 13 to perform the image processing on the image data. The preview-image generating module 14 includes, for example, a dedicated circuit and a dedicated memory that are used for generating a preview image (preview display data). The controller 1 uses the preview-image generating module 14 to generate a preview image for previewing the image data.

The multifunction peripheral 100 further includes an image reader 2. In the copy job or the transmission job, the image reader 2 reads the document to generate the image data of the document. The image reader 2 includes a reading unit 21. The reading unit 21 includes a light source and an image sensor. The light source irradiates the document with light. The image sensor receives light reflected from the document, and performs photoelectric conversion on the light.

The multifunction peripheral 100 further includes a printer 3. The printer 3 transports a sheet, forms a toner image based on the image data, and transfers the toner image onto the sheet being transported. In the copy job, printing is performed by the printer 3 based on the image data of the document having been read by the image reader 2. The printer 3 includes an image forming unit 31 and a fixing unit 32.

The image forming unit 31 includes a photosensitive drum and a transfer roller.

The photosensitive drum and the transfer roller are pressed against each other to form a transfer nip therebetween. The image forming unit 31 further includes a charging device which electrostatically charges a peripheral surface of the photosensitive drum, an exposure device which forms an electrostatic latent image on the peripheral surface of the photosensitive drum, a developing device which develops the electrostatic latent image on the peripheral surface of the photosensitive drum into a toner image, etc. The image forming unit 31 transfers the toner image formed on the peripheral surface of the photosensitive drum onto the sheet passing through the transfer nip.

The fixing unit 32 includes a heat roller and a pressure roller. The heat roller incorporates a heater. The pressure roller is pressed against the heat roller to form a fixing nip therebetween. The fixing unit 32 applies heat and pressure to the sheet passing through the fixing nip, and thereby fixes the toner image on the sheet.

The image reader 2 and the printer 3 are connected to the controller 1. The controller 1 controls the reading operation of the image reader 2, and also controls the printing operation of the printer 3.

The multifunction peripheral 100 further includes an operation panel 4. The operation panel 4 includes a touch screen 41 and a hardware button 42. The touch screen 41 displays a screen in which a software button is arranged, and accepts a touch operation performed by a user on the displayed screen (the software button). The hardware button 42 includes a plurality of hardware buttons 42 arranged on the operation panel 4. In the hardware buttons 42, for example, a start button is included for accepting a starting operation performed by the user to input a command to execute a job.

The operation panel 4 is connected to the controller 1. The controller 1 controls the displaying operation performed by the operation panel 4, and also detects an operation performed on the operation panel 4.

The multifunction peripheral 100 further includes a communicator 5. The communicator 5 is an interface for connecting the multifunction peripheral 100 to a network NT, which includes a telephone line and the Internet, for example, and the communicator 5 includes a communication circuit, a communication memory, a communication connector, and a FAX modem. To the network NT, an external device 200 is connected. The external device 200 is a personal computer (a user terminal used by the user of the multifunction peripheral 100), an external server, a facsimile, or the like. In a case where the multifunction peripheral 100 is connected to the network NT, it is possible to execute the transmission job (including a FAX job).

The communicator 5 is connected to the controller 1. The controller 1 uses the communicator 5 to communicate with the external device 200. The controller 1 transmits and receives data to and from the external device 200. In the transmission job, the image data of the document which has been read at the multifunction peripheral 100 is transmitted from the multifunction peripheral 100 to the external device 200.

The multifunction peripheral 100 further includes a storage 6. The storage 6 includes a nonvolatile storage device such as a ROM (an EEPROM, for example). The storage 6 is connected to the controller 1. The controller 1 reads data from the storage 6 and writes data into the storage 6.

Here, the controller 1 performs character recognition processing, by using the OCR technology, on the image data of the document which has been read by the image reader 2. To make the controller 1 perform the character recognition processing, the storage 6 has stored therein a character database DB which contains pattern-matching character patterns (standard patterns).

The controller 1, when performing the character recognition processing, identifies a character region by performing, for example, layout analysis on the image data, and extracts character images one by one from the character region. Then, the controller 1 performs matching processing by comparing each of the extracted character images with the pattern-matching character patterns contained in the character database DB, and recognizes each character based on the result of the matching processing. Note that the character database DB contains a set of pattern-matching character patterns for each font.

Setting of Resolution:

When the operation panel 4 receives a command to execute the transmission job (a starting operation) from the user, the controller 1 makes the image reader 2 read a document. Then, the controller 1 performs image processing of various kinds on read image data obtained by the reading performed by the image reader 2, and thereby generates output image data from the read image data. For example, when the job to be executed is the FAX job, the image processing performed on the read image data includes, for example, binarization processing in which the pixel value (density value) of each pixel included in the read image data is binarized based on a predetermined threshold value.

After generating the output image data, the controller 1 performs data output processing, which is processing of outputting the output image data. Here, the controller 1 uses the communicator 5 to perform processing of transmitting the output image data to the external device 200. In this configuration, the communicator 5 corresponds to "the output section".

Here, when the operation panel 4 accepts the command to execute the transmission job from the user, the controller 1, before performing the data output, performs resolution setting processing (first-resolution setting processing and second-resolution setting processing), which is processing of automatically setting the resolution of the output image data. Here, the resolution setting processing is performed by the controller 1 based on the recognition result (confidence factor) of the character recognition processing. The controller 1 performs image data generation processing and comparison value setting processing in order to perform the resolution setting processing.

Image Data Generation Processing:

First, the controller 1 performs the image data generation processing. Hereinafter, with reference to the flowchart illustrated in FIG. 2, a description will be given of the flow of the image data generation processing performed by the controller 1. It is assumed that, at the starting time point in the flowchart illustrated in FIG. 2, there has been set one of the predetermined plurality of levels of resolutions (resolutions at which a document is read) that is chosen by the user. Then, when the operation panel 4 accepts a command to execute the transmission job from the user, the flow of the flowchart illustrated in FIG. 2 starts.

Figure 2:
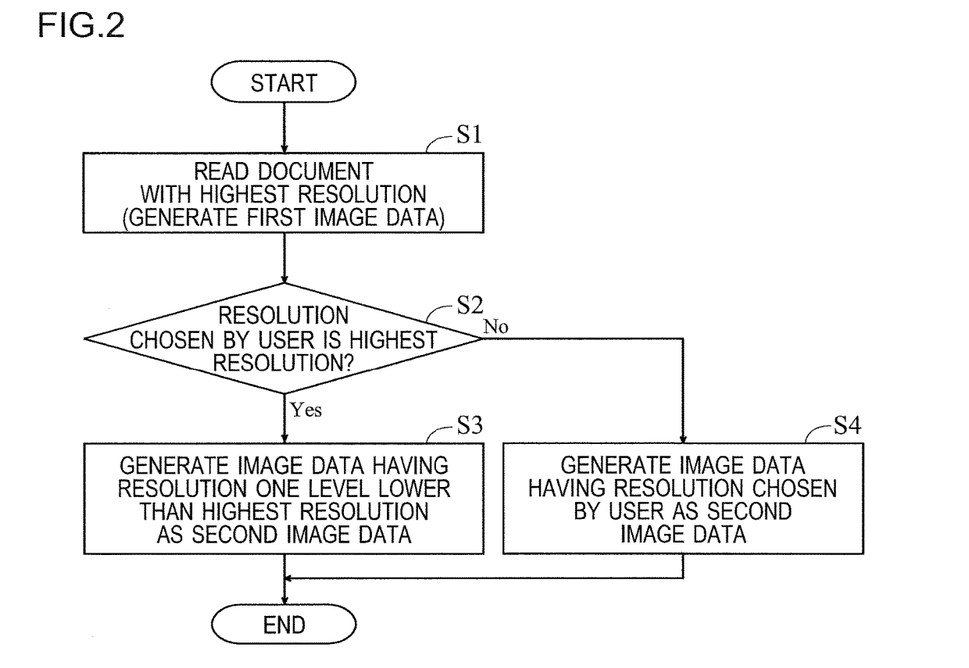
FIG. 2 is a flowchart illustrating a flow of image data generation processing performed by a controller of the multifunction peripheral according to the embodiment of the present disclosure.

Here, the setting of the resolution chosen by the user is accepted by the operation panel 4. The user can choose a reading resolution from the plurality of levels of resolutions. For example, the resolution is classified into three to five levels of resolutions. Although there is no particular limitation to the resolutions, the highest resolution is 600 dpi×600 dpi, and the lowest resolution is 200 dpi×100 dpi.

In step S1, the controller 1 makes the image reader 2 perform reading of the document at the highest resolution of the plurality of levels of resolutions. The image reader 2 reads the document at the highest resolution and generates the image data of the document. Even if the resolution chosen by the user is not the highest resolution, the reading of the document by the image reader 2 is performed at the highest resolution. In the following description, the image data of the document obtained by the reading of the document performed by the image reader 2 at the highest resolution will be referred to as first image data.

After the first image data is generated, in step S2, the controller 1 checks whether the resolution chosen by the user is the highest resolution. When the controller 1 has determined that the resolution chosen by the user is the highest resolution, the flow proceeds to step S3, and when the controller 1 has determined that the resolution chosen by the user is not the highest resolution, the flow proceeds to step S4.

In step S3, the controller 1 generates, from the first image data (the image data having the highest resolution), image data having a resolution one level lower than the highest resolution. In step S4, the controller 1 generates, from the first image data (the image data having the highest resolution), image data having the resolution chosen by the user. Whether in step S3 or in step S4, new image data is generated having a resolution lower than the highest resolution. In the following description, the new image data (the image data having a resolution one level lower than the resolution of the first image data) generated based on the first image data will be referred to as second image data.

For example, in a case where the resolution chosen by the user is the highest resolution, the resolution of the second image data is one level lower than the highest resolution. In a case where the resolution chosen by the user is one level lower than the highest resolution, the resolution of the second image data is the resolution chosen by the user, and thus is one level lower than the highest resolution. In a case where the resolution chosen by the user is two levels lower than the highest resolution, the resolution of the second image data is the resolution chosen by the user, and thus is two levels lower than the highest resolution.

Comparison Value Setting Processing:

After the completion of the image data generation processing, the controller 1 performs the comparison value setting processing. Hereinafter, with reference to the flowchart illustrated in FIG. 3, a description will be given of the flow of the comparison value setting processing performed by the controller 1. The flow of the flowchart illustrated in FIG. 3 starts when the image data generation processing performed by the controller 1 is finished.

Figure 3:
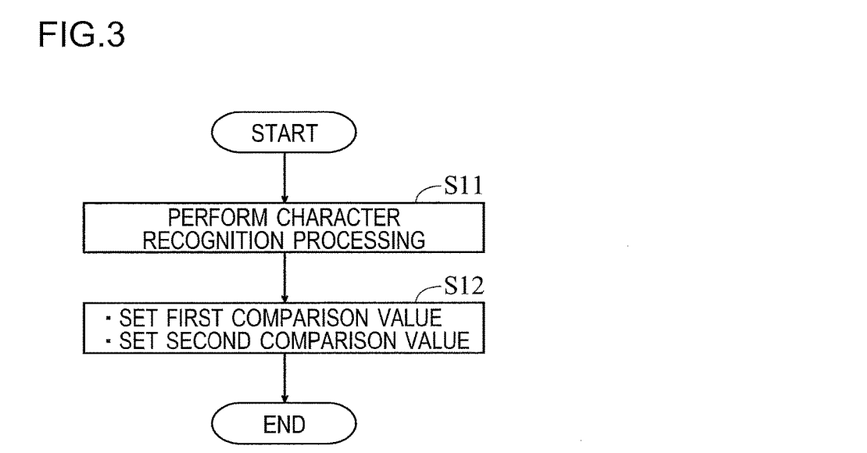
FIG. 3 is a flowchart illustrating a flow of comparison value setting processing performed by the controller of the multifunction peripheral according to the embodiment of the present disclosure.

In step S11, the controller 1 performs the character recognition processing on both the first image data and the second image data. In the following description, the recognition result of the character recognition processing performed on the first image data will be referred to as a first recognition result, and the recognition result of the character recognition processing performed on the second image data will be referred to as a second recognition result.

In step S12, the controller 1, based on the first recognition result, sets a first comparison value to be used in the resolution setting processing. The controller 1, based on the second recognition result, sets a second comparison value to be used in the resolution setting processing.

When the controller 1 sets a value of each of the first comparison value and the second comparison value, the controller 1 performs first processing or second processing. For example, in a case where a setting to enable the first processing has been made, the controller 1 performs the first processing, and in a case where a setting to enable the second processing has been made, the controller 1 performs the second processing. The operation panel 4 accepts the setting regarding whether to enable the first processing or the second processing from the user. The setting to enable the first processing is the default setting.

Here, both in the first processing and in the second processing, the first comparison value and the second comparison value are each set based on the confidence factor of the recognition result of each character in the character recognition processing. The confidence factor is a value (in percentage) that indicates the certainty of the recognition result. The confidence factor is obtained by the controller 1.

For example, when the controller 1 performs the character recognition processing, the controller 1 obtains the degree of similarity (the rate of concordance) in characteristics between an extracted character image extracted from image data and character patterns (standard patterns), and recognizes a character represented by a character pattern having the highest similarity in characteristics to the extracted character image as the character corresponding to the extracted character image (here, for the sake of convenience, such a character pattern is referred to as a best character pattern). Then, the controller 1, based on the similarity in characteristics between the extracted character image and the best character pattern, obtains the confidence factor of the recognition result of this character recognition processing. Although there is no particular limitation, the confidence factor is defied as the similarity in characteristics between an extracted character image and the best character pattern corresponding to the extracted character image. In this case, the higher the similarity in characteristics between the extracted character image and the best character pattern is, the higher the confidence factor becomes (that is, the lower the similarity is, the lower the confidence factor becomes).

In the case where the setting to enable the first processing has been made, the controller 1 obtains the total value of the confidence factors of all the characters in the first recognition result, divides the total value by the number of characters recognized in the character recognition processing performed on the first image data (that is, the number of the confidence factors corresponding to the characters on a one-to-one basis), and sets the thus obtained value as the first comparison value. That is, the controller 1 sets the average value of the confidence factors of the characters in the first recognition result as the first comparison value. Here, the controller 1, in obtaining the average value of the confidence factors of the characters in the first recognition result, does not include the confidence factors obtained with respect to punctuation marks and various signs (for example, an exclamation mark, a question mark, a plus sign, a minus sign, a slash, and so on).

When the controller 1 sets the second comparison value, like when it sets the first comparison value, the controller 1 obtains the average value of confidence factors of characters in the second recognition result. Then, the controller 1 sets the obtained average value as the second comparison value. Here, the controller 1 does not include the confidence factors of punctuation marks or various signs in obtaining the average value of the confidence factors of the characters in the second recognition result, either.

In the case where the setting to enable the second processing has been made, the controller 1 sets any of characters to be recognized in the character recognition processing to be performed on the first image data as a target character (here, none of the punctuation marks and various signs are to be set as the target character). As the target character, just one character may be set, or a plurality of characters may be set. Then, the controller 1 sets the confidence factor of the target character, among the confidence factors of all the characters in the first recognition result, as the first comparison value. Here, in a case where a plurality of characters are set as target characters, the average value of a plurality of confidence factors corresponding to the plurality of target characters is set as the first comparison value.

The controller 1 sets, as the second comparison value, the confidence factor of a character that is the same character and of the same font as the target character, among the confidence factors of all the characters in the second recognition result. Here, in the case where a plurality of characters are set as target characters, the average value of a plurality of confidence factors corresponding to the plurality of target characters is set as the second comparison value.

Resolution Setting Processing:

After finishing the comparison value setting processing, the controller 1 performs the resolution setting processing. Hereinafter, with reference to the flowchart illustrated in FIG. 4, a description will be given of the flow of the resolution setting processing performed by the controller 1. The flow of the flowchart illustrated in FIG. 4 starts when the comparison value setting processing performed by the controller 1 is finished.

Figure 4:
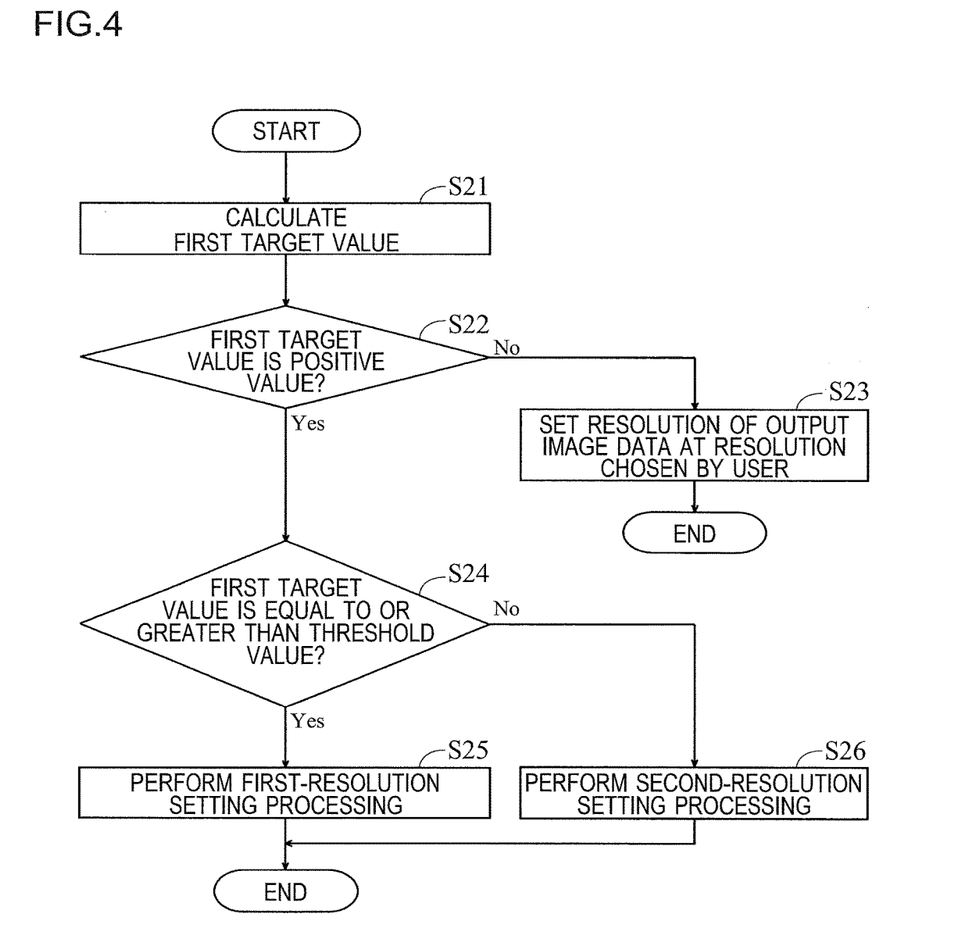
FIG. 4 is a flowchart illustrating a flow of resolution setting processing performed by the controller of the multifunction peripheral according to the embodiment of the present disclosure.

In step S21, the controller 1 obtains a value (hereinafter, referred to as a first target value) by subtracting the second comparison value from the first comparison value. Then, in step S22, the controller 1 checks whether the first target value is a positive value. When, as a result, the controller 1 determines that the first target is a negative value, the flow proceeds to step S23.

Here, the resolution of the first image data is higher than that of the second image data. Hence, normally, the confidence factor is higher in the recognition result of the character recognition processing performed on the first image data (the first recognition result) than in the recognition result of the character recognition processing performed on the second image data (the second recognition result). That is, the first comparison value is greater than the second comparison value. However, when an image unrecognizable in the character recognition processing (an image that is not a character image) is read, there may occur a case where the first comparison value is smaller than the second comparison value (that is, the first target value is a negative value). In such a case, it is impossible to automatically set a resolution based on the recognition result (confidence factor) of the character recognition processing.

Accordingly, in step S23, the controller 1 sets the resolution chosen by the user as the resolution of the output image data. In this case, the controller 1 generates the output image data by performing various kinds of image processing on the image data having the resolution chosen by the user, and makes the communicator 5 transmit the thus generated output image data to the external device 200.

In step S22, when the controller 1 has determined that the first target value is a positive value, the flow proceeds to step S24. In step S24, the controller 1 checks whether or not the first target value is equal to or more than a predetermined threshold value. The threshold value is 10% to 20%, for example. The threshold value can be changed by the user as necessary, and it is the operation panel 4 that accepts, from the user, the change of the threshold value.

In step S24, when the controller 1 has determined that the first target value is equal to or more than the threshold value, the flow proceeds to step S25, and when the controller 1 has determined that the first target value is less than the threshold value, the flow proceeds to step S26. In step S25, the controller 1 performs the first-resolution setting processing. In step S26, the controller 1 performs the second-resolution setting processing.

Here, when the accuracy of the character recognition processing performed on the second image data is significantly lower than the accuracy of the character recognition processing performed on the first image data, the first target value is equal to or more than the threshold value (that is, the difference between the first recognition result and the second recognition result is great). When the first target value is equal to or more than the threshold value, there is a strong possibility that remarkable character deformation has occurred in the second image data. Thus, if the output image data is transmitted to the external device 200 with the resolution of the output image data set at a resolution equal to or lower than the resolution of the second image data, there may occur a disadvantage that a printed matter or a page printed, or displayed, by the external device 200 based on the output image data received from the multifunction peripheral 100 become unclear (that is, difficult to read due to a deformed character). That is, the degree of unclearness is likely to be high. In this case, it is preferable to set the resolution of the output image data at a resolution that is higher than the resolution of the second image data.

On the other hand, when the accuracy of the character recognition processing performed on the second image data is not significantly lower than the accuracy of the character recognition processing performed on the first image data, the first target value is less than the threshold value (that is, the difference between the first recognition result and the second recognition result is small). When the first target value is less than the threshold value, it can be said that no remarkable character deformation has occurred in the second image data. Thus, even if the output image data is transmitted to the external device 200 with the resolution of the output image data set at a resolution equal to the resolution of the second image data, occurrence of the disadvantage that a printed matter or a page printed, or displayed, by the external device 200 based on the output image data received from the multifunction peripheral 100 becomes unclear is reduced (the degree of unclearness becomes low). Under some circumstances, there is a possibility that the occurrence of such a disadvantage is suppressible even with the resolution of the output image data set at a resolution lower than the resolution of the second image data.

First-Resolution Setting Processing: In the first-resolution setting processing performed by the controller 1, the resolution of the output image data is set at a resolution higher than the resolution of the second image data. Hereinafter, with reference to the flowchart illustrated in FIG. 5, a description will be given of the flow of the first-resolution setting processing performed by the controller 1. The flow of the flowchart illustrated in FIG. 5 starts when the controller 1 determines that the first target value is equal to or more than the threshold value.

Figure 5:
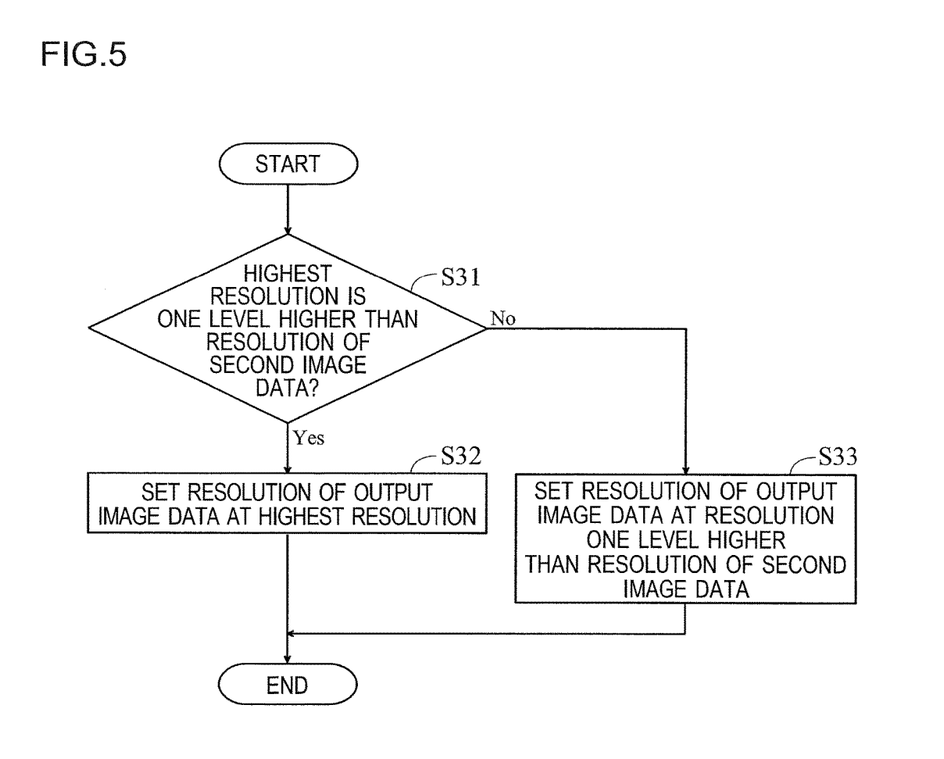
FIG. 5 is a flowchart illustrating a flow of first-resolution setting processing performed by the controller of the multifunction peripheral according to the embodiment of the present disclosure.

In step S31, the controller 1 checks whether a resolution of the plurality of resolutions that is one level higher than the resolution of the second image data is the highest resolution. When, as a result, the controller 1 determines that the resolution one level higher than the resolution of the second image data is the highest resolution, the flow proceeds to step S32. That is, in a case where the resolution chosen by the user is the highest resolution or where the resolution chosen by the user is one level lower than the highest resolution (in a case where the resolution of the second image data is one level lower than the highest resolution), the flow proceeds to step S32.

In step S32, the controller 1 sets the resolution of the output image data at the highest resolution (the resolution one level higher than the resolution of the second image data). In this case, the controller 1 generates the output image data by performing various kinds of image processing on the first image data (the image data having the highest resolution), and makes the communicator 5 transmit the thus generated output image data to the external device 200.

In the case where the resolution chosen by the user is the highest resolution, the output image data transmitted to the external device 200 has the resolution chosen by the user, and in the case where the resolution chosen by the user is one level lower than the highest resolution, the output image data transmitted to the external device 200 has a resolution one level higher than the resolution chosen by the user. In both cases, the output image data transmitted to the external device 200 has the highest resolution.

In step S31, when the controller 1 has determined that the resolution one level higher than the resolution of the second image data is not the highest resolution, the flow proceeds to step S33. That is, in a case where the resolution chosen by the user is two or more levels lower than the highest resolution (in a case where the resolution of the second image data is two or more levels lower than the highest resolution), the flow proceeds to step S33.

In step S33, the controller 1 sets the resolution of the output image data at the resolution one level higher than the resolution of the second image data. In this case, the controller 1 generates, from the first image data (the image data having the highest resolution), image data having a resolution one level higher than the resolution of the second image data. Then, the controller 1 generates the output image data by performing various kinds of image processing on the image data having the resolution one level higher than the resolution of the second image data, and makes the communicator 5 transmit the thus generated output image data to the external device 200.

When the resolution chosen by the user is two or more levels lower than the highest resolution, the output image data transmitted to the external device 200 has a resolution that is higher than the resolution chosen by the user but is lower than the highest resolution (that is, a resolution one level higher than the resolution chosen by the user).

Second-Resolution Setting Processing:

In the second-resolution setting processing performed by the controller 1, the resolution of the output image data is set at a resolution that is equal to or lower than the resolution of the second image data. Hereinafter, with reference to the flowchart illustrated in FIG. 6, a description will be given of the flow of the second-resolution setting processing performed by the controller 1. The flow of the flowchart illustrated in FIG. 6 starts when the controller 1 determines that a first target value is smaller than the threshold value.

Figure 6:
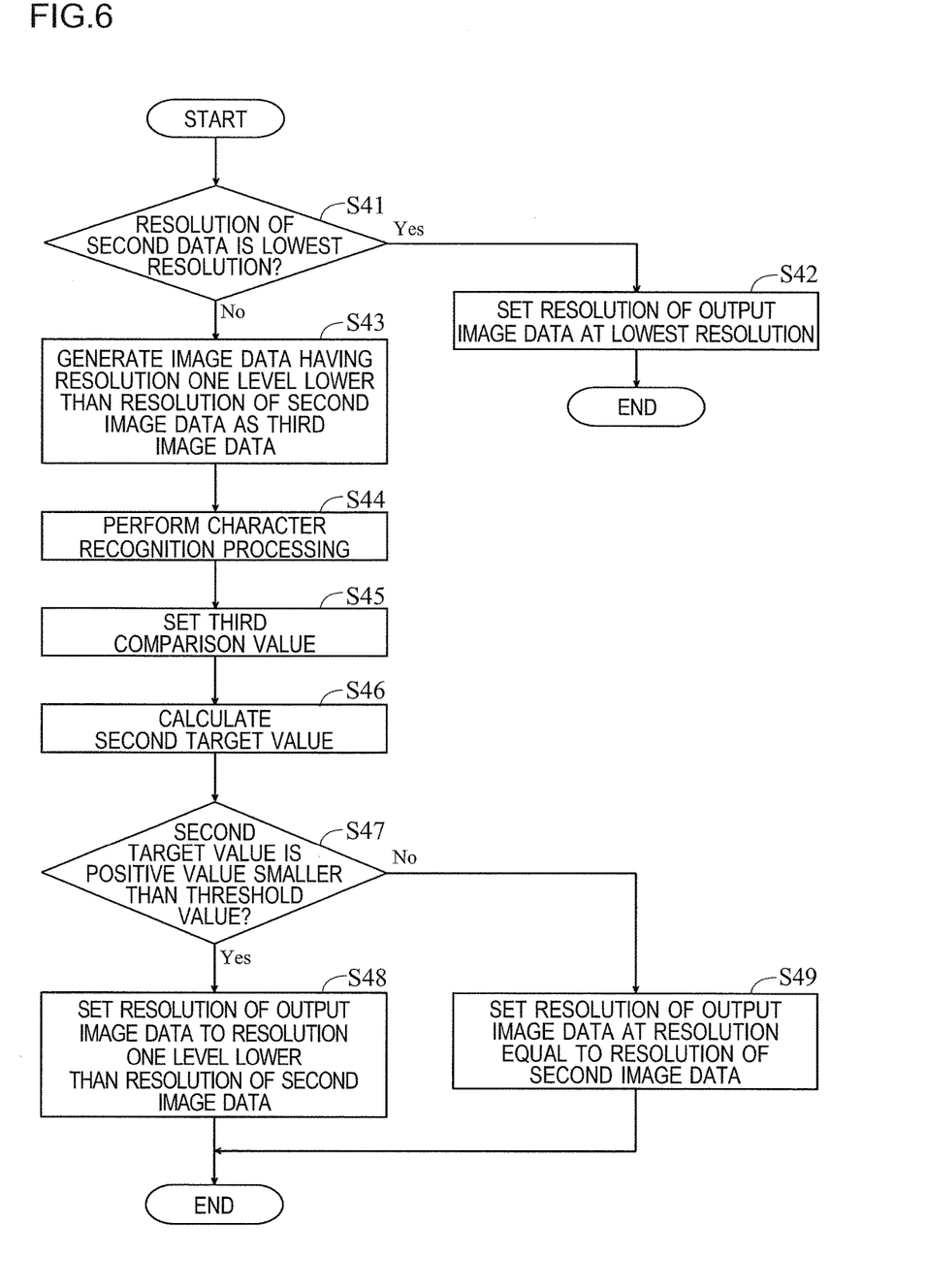
FIG. 6 is a flowchart illustrating a flow of second-resolution setting processing performed by the controller of the multifunction peripheral according to the embodiment of the present disclosure.

In step S41, the controller 1 checks whether the resolution of the second image data is the lowest resolution of the plurality of levels of resolutions. When, as a result, the controller 1 determines that the resolution of the second image data is the lowest resolution, the flow proceeds to step S42. Here, only in a case where the resolution chosen by the user is the lowest resolution, the controller 1 generates image data having the lowest resolution as the second image data. That is, in the case where the resolution chosen by the user is the lowest resolution, the flow proceeds to step S42.

In step S42, the controller 1 sets the resolution of the output image data at the lowest resolution (that is, a resolution equal to the resolution of the second image data). In this case, the controller 1 generates the output image data by performing various kinds of image processing on the second image data (the image data having the lowest resolution), and makes the communicator 5 transmit the thus generated output image data to the external device 200. In the case where the resolution chosen by the user is the lowest resolution, the output image data transmitted to the external device 200 has the resolution chosen by the user.

In step S41, in a case where the controller 1 has determined that the resolution of the second image data is not the lowest resolution, the flow proceeds to step S43. That is, in a case where the resolution chosen by the user is not the lowest resolution, the flow proceeds to step S43.

In step S43, the controller 1 generates, from the first image data (the image data having the highest resolution), new image data having a resolution one level lower than the resolution of the second image data. That is, the controller 1 additionally performs the image data generation processing. In the following description, the new image data (image data having the resolution one level lower than the resolution of the second image data) generated based on the first image data will be referred to as third image data.

In step S44, the controller 1 performs the character recognition processing on the third image data. In the following description, the recognition result of the character recognition processing performed on the third image data will be referred to as a third recognition result.

Then, in step S45, the controller 1 additionally performs the comparison value setting processing on the third recognition result as the target, and sets a third comparison value based on the third recognition result. In the case where the average value of the confidence factors of the characters in the first recognition result has been set as the first comparison value, the controller 1 sets an average value of the confidence factors of the characters in the third recognition result as the third comparison value. On the other hand, in the case where the confidence factor of the target character among the confidence factors of all the characters in the first recognition result has been set as the first comparison value, the controller 1 sets, as the third comparison value, the confidence factor of a character that is the same character and of the same font as the target character, among the confidence factors of all the characters in the third recognition result. Here, in the case where a plurality of characters are set as target characters, the average value of a plurality of confidence factors corresponding to the plurality of target characters is set as the third comparison value.

After the third comparison value is set, in step S46, the controller 1 obtains a value (hereinafter, referred to as a second target value) by subtracting the third comparison value from the first comparison value. Then, in step S47, the controller 1 checks whether the second target value is a positive value smaller than a threshold value (which is the same value as the threshold value used in the processing performed in step S24 illustrated in FIG. 4). When, as a result, the controller 1 determines that the second target value is a positive value smaller than the threshold value, the flow proceeds to step S48, and when the controller 1 determines that the second target value is not a positive value smaller than the threshold value, the flow proceeds to step S49.

In step S48, the controller 1 sets the resolution of the output image data at a resolution one level lower than the resolution of the second image data (that is, a resolution equal to the resolution of the third image data). In this case, the controller 1 generates the output image data by performing various kinds of image processing on the third image data, and makes the communicator 5 transmit the thus generated output image data to the external device 200.

In the case where the resolution chosen by the user is the highest resolution, the resolution of the second image data is one level lower than the highest resolution. Accordingly, in the case where the resolution chosen by the user is the highest resolution, the output data transmitted to the external device 200 has a resolution that is two levels lower than the resolution chosen by the user. In a case where the resolution chosen by the user is one or more levels lower than the highest resolution, the second image data has the resolution chosen by the user. Accordingly, in the case where the resolution chosen by the user is one or more levels lower than the highest resolution, the output image data transmitted to the external device 200 has a resolution one level lower than the resolution chosen by the user.

In step S49, the controller 1 sets the resolution of the output image data at a resolution equal to the resolution of the second image data. In this case, the controller 1 generates the output image data by performing various kinds of image processing on the second image data, and makes the communicator 5 transmit the thus generated output image data to the external device 200.

In the case where the resolution chosen by the user is the highest resolution, the resolution of the second image data is one level lower than the highest resolution. Accordingly, in the case where the resolution chosen by the user is the highest resolution, the output data transmitted to the external device 200 has a resolution one level lower than the resolution chosen by the user. In the case where the resolution chosen by the user is one or more levels lower than the highest resolution, the second image data has the resolution chosen by the user. Accordingly, in the case where the resolution chosen by the user is one or more levels lower than the highest resolution, the output image data transmitted to the external device 200 has the resolution chosen by the user.

Preview of Output Image Data: When the resolution set in the resolution setting processing is different from the resolution chosen by the user, the controller 1 uses the preview-image generating module 14 to generate a preview image PV (see FIG. 7) for previewing the output image data having the resolution set in the resolution setting processing. Then, the controller 1 makes the operation panel 4 provide notification that the resolution of the output image data is different from the resolution chosen by the user. At this time, the operation panel 4 displays, for example, a preview screen 400 illustrated in FIG. 7.

Figure 7:
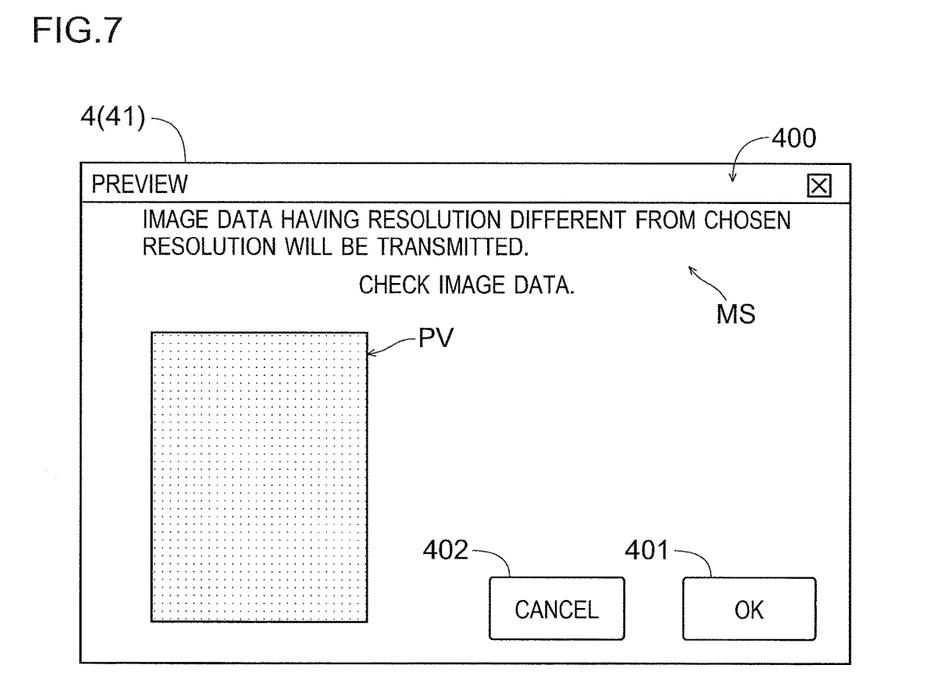
FIG. 7 is a diagram illustrating a preview screen displayed by an operation panel of the multifunction peripheral according to the embodiment of the present disclosure.

The preview screen 400 has arranged therein a message MS to the effect that the resolution of the output image data is different from the resolution chosen by the user, and a preview image PV corresponding to the output image data. The preview screen 400 further has arranged therein software buttons including an OK button 401 and a cancellation button 402, for example.

On detecting a touch operation performed on the OK button 401, the controller 1 proceeds with the transmission job. That is, the controller 1 makes the communicator 5 transmit the output image data having the resolution set in the resolution setting processing to the external device 200. On the other hand, on detecting a touch operation performed on the cancellation button 402, the controller 1 cancels the transmission job.

The multifunction peripheral 100 (an image forming apparatus) of the present embodiment includes, as described above, the image reader 2, which reads a document to generate image data of the document, the controller 1, which generates output image data from the image data of the document, and the communicator 5 (an output section), which transmits the output image data to the external device 200. The image reader 2 reads a document at a resolution of the predetermined plurality of levels of resolutions. From the first image data, which is image data of the document obtained by the reading of the document performed at the highest resolution, the controller 1 generates the second image data having a resolution lower than the highest resolution, and performs the character recognition processing on both the first image data and the second image data. The controller 1 further performs the first processing or the second processing to set the first comparison value and the second comparison value. Then, the controller 1 automatically sets the resolution of the output image data based on the result of comparison between the first comparison result and the second comparison result.

Here, when the resolution chosen by the user is the highest resolution, the controller 1 generates image data having a resolution one level lower than the highest resolution as the second image data, and when the resolution chosen by the user is not the highest resolution, the controller 1 generates image data having the resolution chosen by the user as the second image data. That is, one of the first image data and the second image data has the resolution chosen by the user.

According to the configuration of the present embodiment, the controller 1 performs comparison between the first comparison value (the first recognition result) and the second comparison value (the second recognition result). Thereby, the controller 1 is able to determine the lowest resolution capable of keeping unclearness within a tolerable range. As a result, the controller 1 is able to automatically set the resolution of the output image data at the lowest resolution capable of keeping unclearness within the tolerable range. This saves the user determining by himself/herself the lowest resolution capable of keeping unclearness within the tolerable range, and thus is convenient to the user.

Furthermore, according to the present embodiment, as described above, when the first target value obtained by subtracting the second comparison value from the first comparison value is equal to or more than the threshold value, the controller 1 sets the resolution of the output image data at a resolution one level higher than the resolution of the second image data. Here, in the case where the first target value is equal to or more than the threshold value, there is a strong possibility that remarkable character deformation has occurred in the second image data. Hence, in the case where the first target value is equal to or more than the threshold value, the resolution of the output image data is set at a resolution one level higher than the resolution of the second image data (it is determined that the resolution is the lowest resolution capable of keeping unclearness within the tolerable range). Thereby, it is possible to suppress increase of unclearness.

Moreover, according to the present embodiment, as described above, when the first target value is a positive value smaller than the threshold value, if the resolution of the second image data is the lowest resolution, the controller 1 sets the resolution of the output image data at the lowest resolution. Here, in the case where the first target value is a positive value smaller than the threshold value, it can be said that no remarkable character deformation has occurred in the second image data. Hence, in the case where the first target value is a positive value smaller than the threshold value and in addition the resolution of the second image data is the lowest resolution, the resolution of the output image data is set at the lowest resolution (the resolution is determined as the lowest resolution capable of keeping unclearness within the tolerable range). Thereby, it is possible to suppress increase of unclearness while suppressing increase of data transmission amount (data transmission time). For example, if increase of the data transmission amount is suppressed, it is possible to reduce communication cost.

Furthermore, according to the present embodiment, as described above, when the second target value obtained by subtracting the third comparison value from the first comparison value is a positive value smaller than the threshold value, the controller 1 sets the resolution of the output image data at a resolution equal to the resolution of the third image data. Thereby, it is possible to suppress increase of unclearness while suppressing increase of data transmission amount (data transmission time). On the other hand, when the second target value is not a positive value smaller than the threshold value, the controller 1 sets the resolution of the output image data at a resolution equal to the resolution of the second image data. Thereby, it is possible to suppress increase of unclearness. Here, in the case where the resolution of the output image data is set at a resolution equal to the resolution of the second image data, the data transmission amount (the data transmission time) increases as compared with the case where the resolution of the output image data is set at a resolution equal to the resolution of the third image data.

Moreover, according to the present embodiment, as described above, when the resolution of the output image data is different from the resolution chosen by the user, the controller 1 makes the operation panel 4 display the preview screen 400. This makes it possible to check in advance the output image data having the automatically set resolution, which is convenient to the user.

It should be understood that the embodiments disclosed herein are merely illustrative in all respects, and should not be interpreted restrictively. The range of the present disclosure is shown not by the above descriptions of embodiments but the scope of claims for patent, and it is intended that all modifications within the meaning and range equivalent to the scope of claims for patent are included.

For example, although the present disclosure is applied to the multifunction peripheral 100 in the above-described embodiment, it is also possible to apply the present disclosure to other image forming apparatuses such as a facsimile and so on (image forming apparatuses that read a document and externally output the image data of the document).

Moreover, the above descriptions of the embodiment have dealt with cases where the resolution setting processing (including the image data generation processing and the comparison value setting processing) is performed when a transmission job such as the fax job is executed, but this is not meant to limit the present disclosure, and the resolution setting processing may be performed when the copy job is executed. In that case, printing of an image on a sheet based on the output image data is performed by the printer 3, and a printed matter is externally outputted. Thus, the printer 3 functions as the "output section".

What is claimed is:

1. An image forming apparatus comprising:
   an image reader which reads a document, and generates image data of the document;
   a controller
   which includes a circuit that performs image processing, which performs the image processing with respect to the image data of the document, and
   which generates output image data from the image data of the document; and
   an output section which externally outputs the output image data,
   wherein
   the output section is
   a communicator which transmits the output image data to an external device, or
   a printer which prints an image on a sheet based on the output image data,
   the image reader reads the document at a highest resolution of a predetermined plurality of levels of resolutions,
   the controller
   generates second image data having a resolution lower than the highest resolution from first image data, which is image data of the document obtained by reading of the document performed at the highest resolution,
   performs character recognition processing on both the first image data and the second image data,
   performs
   processing in which an average value of confidence factors of characters in a first recognition result, which is a recognition result of the character recognition processing performed on the first image data, is set as a first comparison value and an average value of confidence factors of characters in a second recognition result, which is a recognition result of the character recognition processing performed on the second image data is set as a second comparison value, or
   processing in which any of the characters recognized in the character recognition processing performed on the first image data is set as a target character, a confidence factor of the target character, among the confidence factors of the characters in the first recognition result, is set as the first comparison value, and a confidence factor of a character that is a same character and of a same font as the target character, among the confidence factors of the characters in the second recognition result, is set as the second comparison value, and
   sets the resolution of the output image data at a resolution one level higher than a resolution of the second image data when a value obtained by subtracting the second comparison value from the first comparison value is equal to or more than a predetermined threshold value.

2. The image forming apparatus according to claim 1, wherein,
   when the value obtained by subtracting the second comparison value from the first comparison value is a positive value smaller than the threshold value, if the resolution of the second image data is a lowest resolution of the predetermined plurality of levels of resolutions, the controller sets the resolution of the output image data at the lowest resolution.

3. The image forming apparatus according to claim 2, wherein,
   when the value obtained by subtracting the second comparison value from the first comparison value is a positive value smaller than the threshold value, if the resolution of the second image data is not the lowest resolution,
   the controller generates third image data having a resolution one level lower than the resolution of the second image data to perform the character recognition processing on the third image data, and, in a case where the average value of the confidence factors of the characters in the first recognition result is set as the first comparison value, the controller sets, as a third comparison value, an average value of confidence factors of characters in a third recognition result, which is a recognition result of the character recognition processing performed on the third image data, while in a case where the confidence factor of the target character, among the confidence factors of the characters in the first recognition result, is set as the first comparison value, the controller sets, as the third comparison value, a confidence factor of a character that is a same character and of a same font as the target character, among the confidence factors of the characters in the third recognition result, and when a value obtained by subtracting the third comparison value from the first comparison value is a positive value smaller than the threshold value, the controller sets the resolution of the output image data at a resolution equal to a resolution of the third image data, while, when the value obtained by subtracting the third comparison value from the first comparison value is not a positive value smaller than the threshold value, the controller sets the resolution of the output image data at a resolution equal to the resolution of the second image data.

4. The image forming apparatus according to claim 1, further comprising an operation panel which accepts setting of a resolution chosen by a user, wherein, when the value obtained by subtracting the second comparison value from the first comparison value is a negative value, the controller sets the resolution of the output image data at the resolution chosen by the user.

5. The image forming apparatus according to claim 1, further comprising an operation panel which accepts setting of a resolution chosen by a user, wherein, the controller generates image data having a resolution one level lower than the highest resolution as the second image data when the resolution chosen by the user is the highest resolution, while the controller generates image data having the resolution chosen by the user as the second image data when the resolution chosen by the user is not the highest resolution.

6. The image forming apparatus according to claim 5, wherein, when the resolution of the output image data which has been set is different from the resolution chosen by the user, the controller makes the operation panel provide notification that the resolution of the output image data is different from the resolution chosen by the user.

7. The image forming apparatus according to claim 6, wherein, when the resolution of the output image data which has been set is different from the resolution chosen by the user, the controller generates a preview image for previewing the output image data, and makes the operation panel display the preview image.

* * * * *